Nov. 14, 1961  F. T. P. PLIMPTON, JR  3,008,297
POWER GENERATING SYSTEMS
Filed Nov. 28, 1958  4 Sheets-Sheet 2
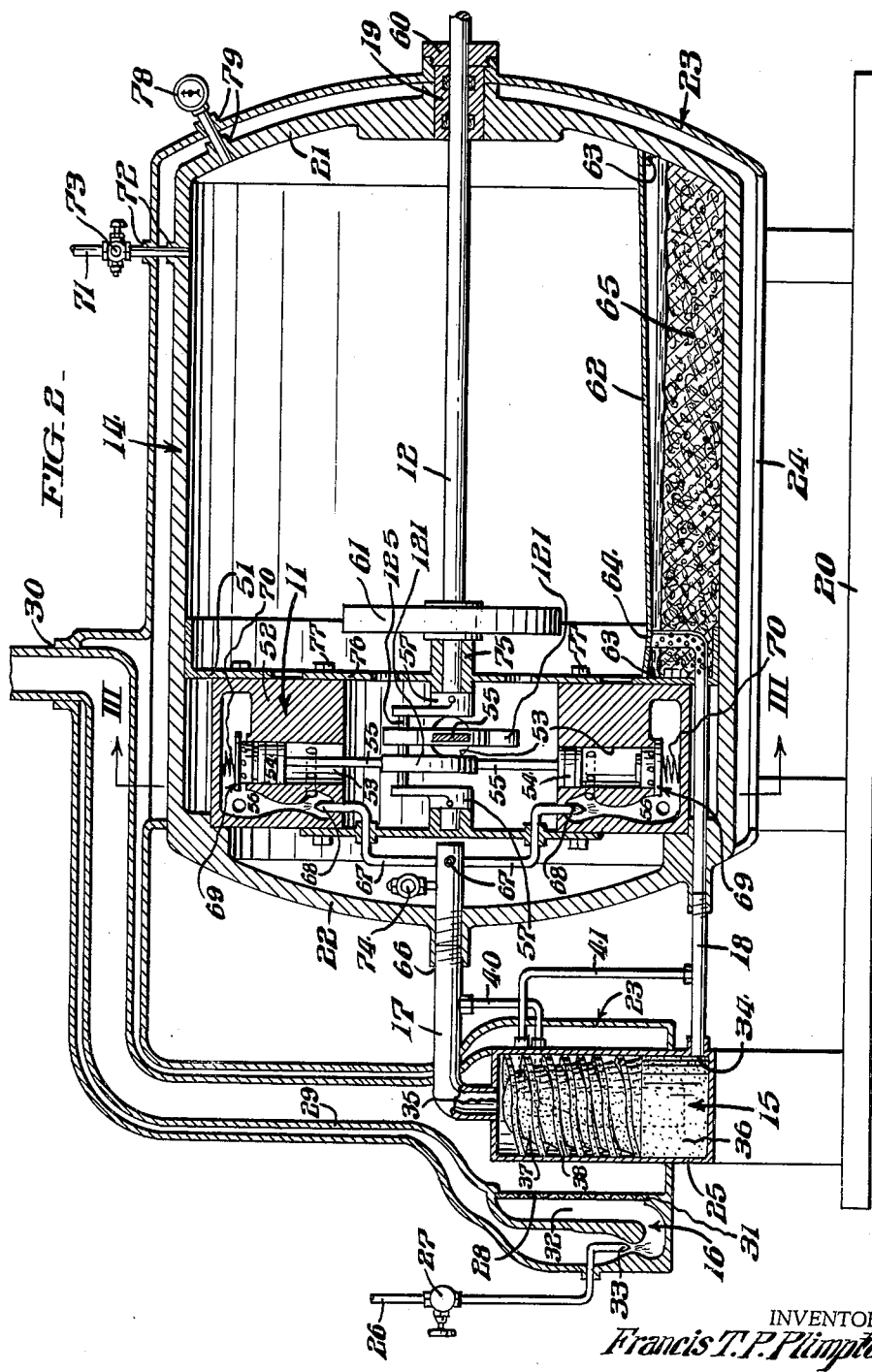
INVENTOR.
Francis T. P. Plimpton, Jr.,
BY Paul & Paul
ATTORNEYS.

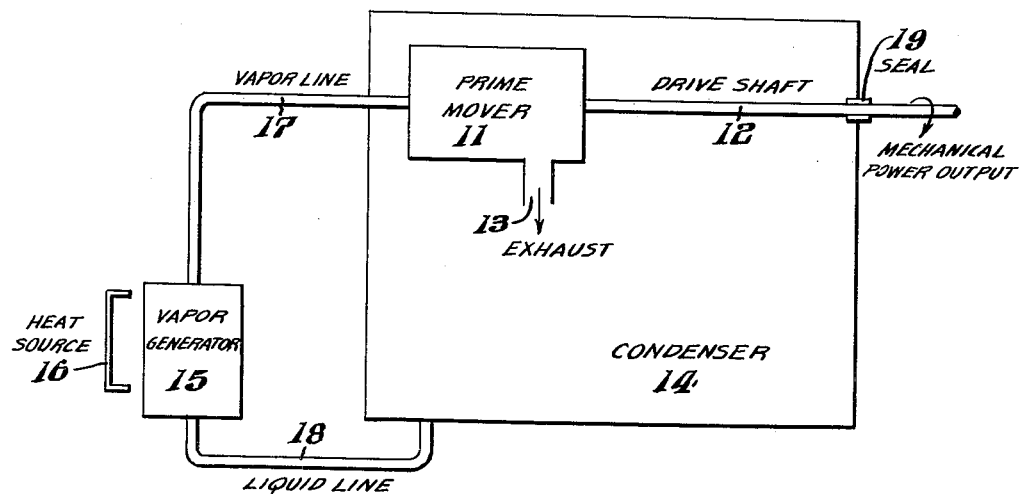

Nov. 14, 1961 F. T. P. PLIMPTON, JR 3,008,297
POWER GENERATING SYSTEMS
Filed Nov. 28, 1958 4 Sheets—Sheet 3
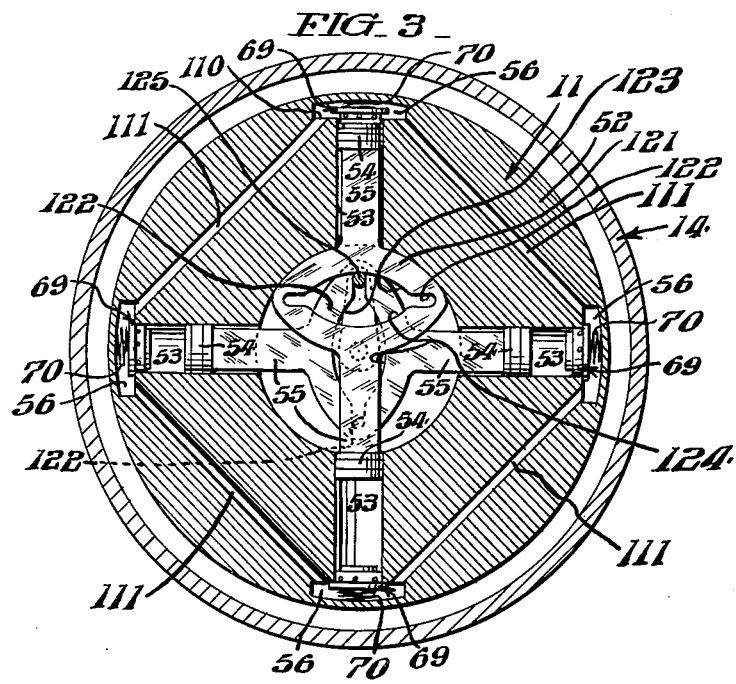
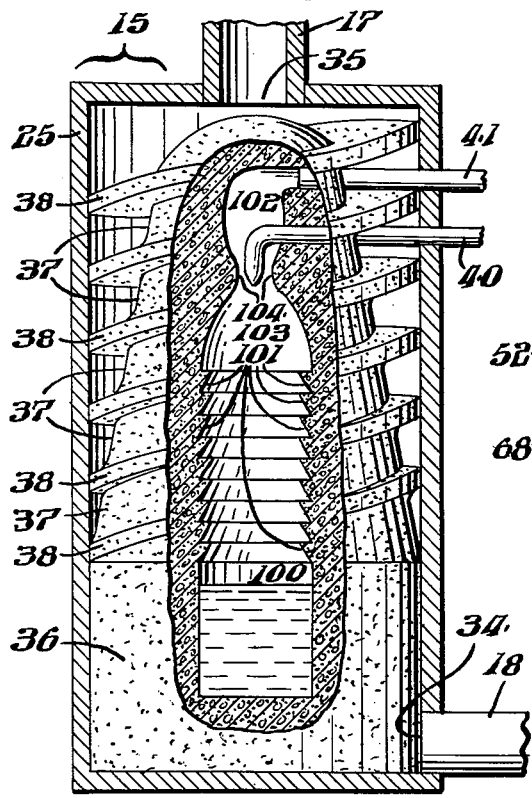
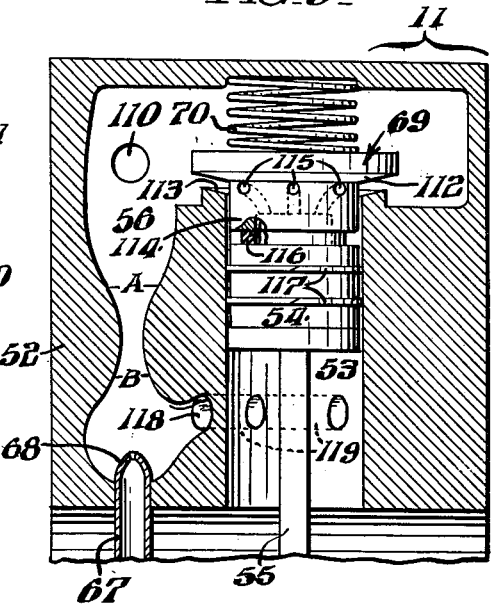
INVENTOR.
Francis T. P. Plimpton, Jr.
BY
Paul & Paul
ATTORNEYS.

Nov. 14, 1961  F. T. P. PLIMPTON, JR  3,008,297
POWER GENERATING SYSTEMS

Filed Nov. 28, 1958  4 Sheets-Sheet 4

INVENTOR.
Francis T. P. Plimpton, Jr.,
BY Paul & Paul
ATTORNEYS.

United States Patent Office 3,008,297
Patented Nov. 14, 1961

3,008,297
POWER GENERATING SYSTEMS
Francis T. P. Plimpton, Jr., 1115 Maplecrest Circle,
Gladwyne, Pa.
Filed Nov. 28, 1958, Ser. No. 776,800
4 Claims. (Cl. 60—108)

This invention relates to power generating systems and more particularly to power generating systems in which an elastic fluid such as steam is utilized as the operating medium.

It is an object of this invention to provide a compact power generating system of the type utilizing an elastic fluid operating medium for use as the power plant of land, marine or aircraft vehicles as well as for use in central plant power generating units.

It is another object to provide such a power generating system that operates on a closed cycle principle, i.e. requiring no replenishment of the operating medium.

Still another object of this invention is to provide a power generating system of this type which does not require periodic conditioning treatment of the operating medium.

A further object is to provide a power generating system utilizing an elastic fluid operating medium which has a single positive control means for regulating the power output of the system and in which the power output is highly responsive to the energy input to the system.

A still further object of this invention is to provide a power generating system of the aforementioned type wherein throttling of the elastic fluid operating medium is substantially eliminated.

Another object is to provide an automatic liquid supply system for the vapor generator of power generating systems utilizing elastic fluid operating mediums.

Other objects and advantages of this invention will become apparent from a reading of the following description and by reference to the accompanying drawings which illustrate certain specific embodiments of this invention, wherein:

FIG. 1 represents a schematic diagram of the power generating system of this invention.

FIG. 2 illustrates a side elevational view in section of one embodiment of the apparatus of this invention.

FIG. 3 is a sectional view taken in the direction of the lines and arrows III—III of FIG. 2.

FIG. 4 is a detailed view in elevational section of the vapor generator of the apparatus of FIG. 2, parts thereof being broken away.

FIG. 5 is a detailed view in elevational section of the prime mover associated with the apparatus of FIGS. 2 and 3.

Figure 6:
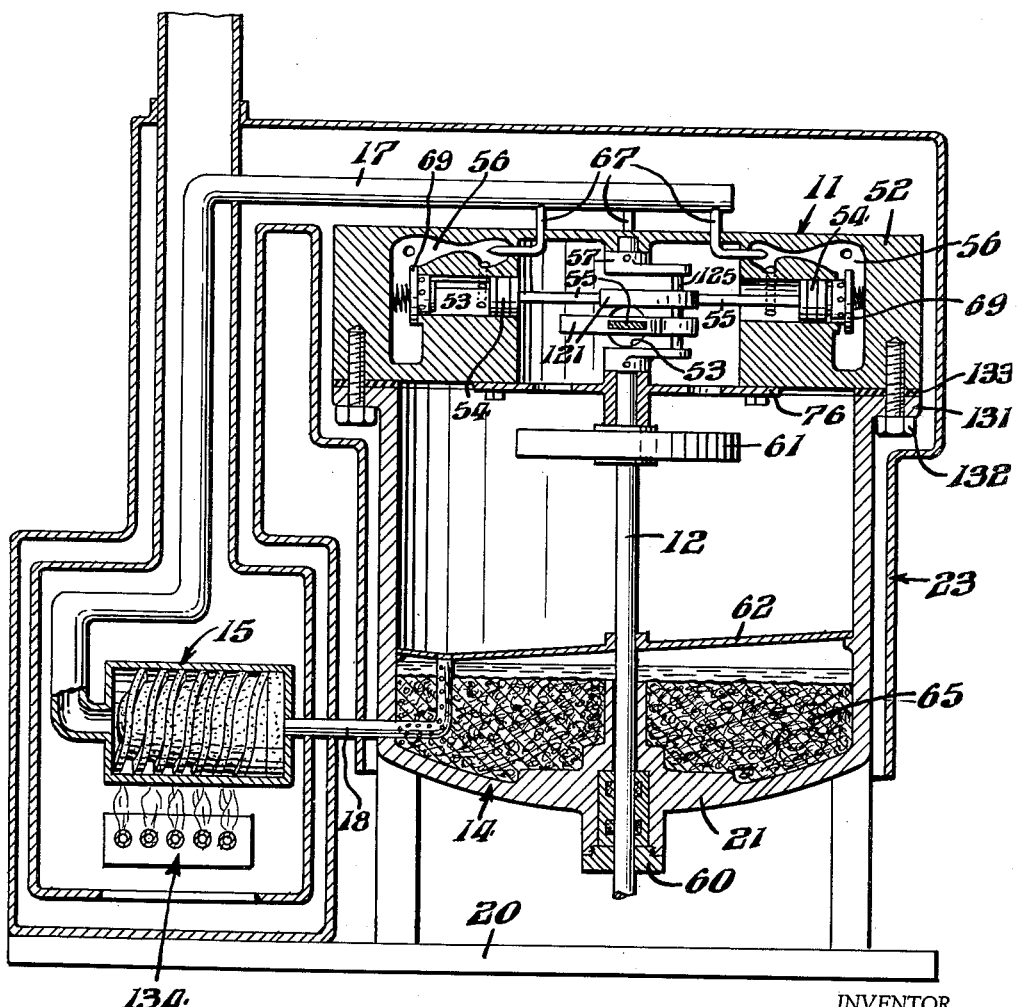
FIG. 6 illustrates a view similar to that of FIG. 2 of a modification of the apparatus of this invention.

Referring to the schematic representation of FIG. 1, there is shown a prime mover 11 having a drive shaft 12 and an exhaust opening 13, the prime mover being disposed entirely within the enclosure of a condenser case 14. A vapor generator 15, having a separate heat source 16, is disposed externally of the condenser case 14. Communicating from the vapor generator 15 into the prime mover 11 is a vapor conduit 17, which extends through the wall of condenser case 14. A liquid supply conduit 18 connects the lower portion of condenser case 14 with the vapor generator 15. The aforementioned combination of elements when constructed and operated in accordance with the principles of this invention constitutes a novel power generating system. In operation, the condenser case 14 is partially filled with a condensed elastic fluid such as water, mercury or like condensables. The condensed fluid flows by gravity through the liquid supply conduit 18 to the inlet side of the vapor generator 15. The vapor generator 15 operates on the "flash boiler" principle and converts the condensed fluid into vapor as the liquid is exposed in the "flashing" portion of the vapor generator 15. The heat source 16 directs a controlled amount of heat upon the shell of the vapor generator 15 such that the amount and rate of vapor generation are directly proportional to the rate of heat energy supplied by the source 16. The generated vapor is conducted directly through the vapor conduit 17 into the prime mover 11 where the generated heat energy is expended and converted to mechanical energy. A drive shaft 12 transmits this mechanical energy through a vapor seal 19 in the wall of the condenser case 14 for external usage as mechanical power. Exhausted vapor from the prime mover 11 passes through the exhaust opening 13 into the interior of the condenser case 14 where it is condensed thereby replenishing the original liquid charge. The power generating system contains only condensable fluid, noncondensables being purged when necessary.

Referring now to the specific embodiment of the apparatus of this invention shown in FIG. 2, a base 20 provides support for a generally cylindrical condenser case 14 having integral domed end portions 21 and 22, the condenser case being partially surrounded by a cooling jacket 23 which has an intake opening 24 formed therein. The optimum location of opening 24 will be described more fully hereinafter. Base 20 likewise supports a vapor generator 15 externally of the condenser case 14, the vapor generator being contained by a boiler shell 25 which is also partially surrounded by a portion of the cooling jacket 23. A controlled source of heat 16, shown in FIG. 2 as consisting of a fuel supply line 26, having a manual control valve 27 and a burner grid 28, is shown mounted integrally with boiler shell 25 and positioned with respect thereto so as to emit heat radiations upon the surface of shell 25. A combustion gas exhaust stack 29 is disposed within the cooling jacket 23 in exhausting relationship with burner grid 28, and passes through the wall of jacket 23 at port 30 and finally terminates in an exhaust opening (not shown). The aforementioned heat source may be of the uni-directional type, however other conventional heat sources may be readily used in accordance with the principles of this invention. Conventional fuels may be utilized as well as solar and nuclear fuel sources. Burner grid 28 is retained by a groove 31 formed in exhaust stack 29 which may be adapted to any shape necessary to conform to the shape of the grid. A mixing chamber 32 for the mixing of fuel and air is formed in the exhaust stack 29 on the fuel supply side of burner grid 28, the mixing being aided by a venturi restriction at the junction of cooling jacket 23 and exhaust stack 29 into which fuel is supplied from a fuel nozzle 33 located at the discharge end of fuel supply line 26. The boiler shell 25 is generally cylindrical and has a liquid inlet opening 34 located at the lower end thereof and a somewhat larger vapor outlet opening 35 located in the upper end thereof. Disposed within shell 25 is a solid porous medium evaporator 36. The general shape of porous medium 36 conforms substantially to that of the inner surface of shell 25, especially in the vicinity of the liquid inlet opening 34 where full conformance is shown. A regular or irregular helical channel is formed throughout a portion of the porous medium 36, which channel terminates at the vapor outlet end of shell 25. The cross-sectional area of this channel increases in the direction of the vapor outlet opening 34. In FIG. 2 this channel is shown as a groove 37 which is formed on the cylindrical surface of porous medium evaporator 36, the ridges 38 of the groove 37 forming the sides of the helical channel and maintaining close contact with the inner cylindrical surface of shell 25 to the terminus of groove 37 at the vapor outlet end. The main vapor line 17 extends from vapor outlet opening 35. A secondary vapor line 40 communicates from main vapor line 17 into the vapor generator, and a secondary liquid line 41 communicates from the main liquid line 18 into the vapor generator. As shown in FIG. 4, the porous medium evaporator 36 has formed centrally thereof a hollowed cavity extending axially of the generally cylindrical evaporator body. This cavity consists of a lower well portion 100; a central portion having downwardly notched annular grooves 101 formed therein; and an irregularly shaped upper portion which consists of an upper section 102, a lower section 103 and a restricted section 104. The secondary liquid line 41 discharges into upper section 102 of the evaporator cavity and the secondary vapor line 40 discharges into lower section 103 at its confluence with restricted section 104. This arrangement of liquid and vapor lines serves to form a vapor jet pump, the purpose of which will be more fully described hereinafter.

Condenser case 14 has rigidly mounted therein a prime mover 11 shown in FIG. 2 as a radial, 4-cylinder, modified-uniflow engine, a flanged cylindrical bracket 51 providing the necessary rigid support for the engine. The uniflow engine, modified in accordance with certain embodiments of this invention comprises an annular engine block 52, having formed therein a plurality of radially arranged cylinders 53, which cylinders are arranged in radially opposed pairs; a piston 54 mounted for reciprocation within each cylinder, the pistons of each radially opposed pair of cylinders being mounted at opposite ends of a rigid connecting rod 55; a vapor chest 56, inlet and exhaust openings for each cylinder 53; and a crankshaft 57 mounted in a cranking relationship with connecting rods 55. Further details of this uniflow engine will be described more fully in a subsequent portion of this description. Crankshaft 57 is in turn connected to drive shaft 12, shaft 12 extending through a vapor seal 19, which is in turn held in place by a threaded bushing 60, to the exterior of jacket 23 and condenser case 14. A flywheel 61 is mounted integrally with shaft 12. Extending partially throughout the condenser case in its lower portion is a rigid drain pan 62 which is supported by lips 63, formed integrally with case 14 and bracket 51. The pan 62 is constructed so as to have a low portion therein, at which portion is located a drain opening 64. Communicating with opening 64 is the perforated upturned end portion of main liquid line 18, line 18 passing through domed end portion 22 and having vapor tight threads in engagement therewith. A spongy absorbent mass 65 is disposed between the lower surface of pan 62 and the inner cylindrical surface of condenser case 14 and is retained longitudinally by bracket 51 and domed end portion 21. Mass 65 is shown in FIG. 2 as occupying less than the total space in which it is disposed, but may occupy the full space if necessary or less space than is shown.

A portion of main vapor line 17 communicates with the interior of condenser case 14 by means of a vapor tight threaded opening 66 in domed end portion 22 and terminates in close proximity to engine block 52. Emanating from the closed end portion of line 17 are vapor feeder lines 67, each feeder line communicating with the vapor chest 56 of a cylinder 53 and terminating therein in a nozzle 68. The inlet openings of cylinders 53 are normally closed by valves 69 which are provided with compression springs 70.

A non-condensable purge line 71 is provided, this line extending from the interior of case 14, through case 14 and jacket 23 by means of vapor tight threaded fittings 72. A combination manual and automatic safety valve 73 is located in line 71 exteriorally of jacket 23. An automatic safety valve 74 is provided adjacent the closed end of main vapor line 17 within condenser case 14.

The drive shaft 12 is journalled in a main bearing 75, which is in turn formed integrally with plate 76. The plate 76 is rigidly affixed to the engine block 52 by means of studs 77.

A vapor pressure gage 78 is shown mounted in communication with the interior of condenser case 14 by means of vapor tight fittings 79.

The detailed construction of the prime mover incorporated with the apparatus illustrated in FIG. 2 is best shown in FIGS. 3 and 5. The vapor chest 56 comprises generally three separate portions. One portion consists of that space above line —A— of FIG. 5; a second portion consists of that space below line —B—; and a third portion consists of the restricted channel between lines —A— and —B—. In the upper portion of each vapor chest 56, an opening 110 communicates with a connecting passage 111, formed in the engine block 52, each connecting passage thereby joining the vapor chests of two adjacent cylinders 53. Valve 69, which comprises the head of the cylinder 53, has a machined face 112 which conforms to the shape of a valve seat 113 which is machined into the engine block 52. Depending from each valve face 112 is a cylindrical valve body 114, the diameter of the valve body being less than the bore of cylinder 53. A plurality of vapor channels 115 connect the upper cylindrical surface of the body 114 with the lower surface of body 114. An annular shock absorber 116 is affixed to the lower end surface of valve body 114 and depends therefrom. Each piston 54 is provided with a plurality of piston rings 117. An opening 118 in the lower portion of each vapor chest 56 communicates via exhaust by-pass channels 119 with corresponding openings in the wall of cylinder 53. Also extending into the lower portion of each vapor chest is the nozzle 68 formed at the discharge end of feeder line 67, the nozzle axis being oriented substantially coaxially with the axis of the restricted channel formed in block 52 between lines —A— and —B—.

Referring now to FIG. 3, each connecting rod 55, has a generally elliptical cross-head 121 formed integrally therewith and spaced substantially equi-distantly of an opposed pair of pistons 54. Each cross-head has a cranking slot 122 formed therein, this slot having its axis generally perpendicular to the longitudinal axis of the connecting rod 55. Slot 122 is enlarged throughout a central portion thereof so as to form a pair of opposed arcuate surfaces 123 and 124. The connecting rods 55 of each pair of opposed pistons 54 have their movement in parallel planes and are each arranged in cranking relationship with the crank pin 125 of crankshaft 57. The curvature of surfaces 123, 124 is substantially equivalent to that of the arc described by crank pin 125. Frictional contact between the crank pin 125 and the arcuate surfaces 123 and 124 is reduced by means of a coating applied to these surfaces such as, for example, the material "Teflon," which is manufactured by E. I. du Pont de Nemours & Co., Inc.

*Operation*

Preliminary to operating the power generating system of this invention, a quantity of operating medium in its liquid state is charged into the condenser case 14. This liquid collects on drain pan 62 and flows through drain opening 64 and the perforated portion of line 18, thereby filling the main liquid line 18 and entering the absorbent mass 65, which may be constructed from any conventional sponge like material, such as natural sponge, cellulose sponge, and other artificial sponge materials. The purpose of the absorbent mass 65 is to reduce the free surface effect of the liquid operating medium when the power generating system is utilized as a marine engine, thereby reducing stability problems. Liquid in excess of the capacity of line 18 and the absorbent mass 65 fills the free space below drain pan 62 and overflows onto the pan itself.

It is preferable to introduce as pure an operating medium as possible into the system, since in accordance with this invention the operating medium is recycled, requiring little, if any, replenishment. To start the system, control valve 27 is opened slightly and combustion of the fuel supplied through line 26 is induced by any conventional means. Upon the formation of an air-fuel mixture in mixing chamber 32, the burner grid 28 is gradually heated to incandescence by the combustion of the mixture on the grid surface, thereby emitting focused heat radiations upon the outer surface of a portion of boiler shell 25. Preferably, the radiations from burner grid 28 are focused only on that area of the boiler shell 25 which surrounds that portion of the porous medium evaporator 36 which has a helical groove 38 formed thereon. This heated area will be referred to for purposes of description as the flashing portion of the vapor generator. Liquid is supplied to the flashing portion primarily by means of the capillary action of porous medium 36, whereby condensate is drawn from the main liquid line 18. Suitable materials for use as porous mediums in accordance with this invention are porous graphite, porous ceramic, powdered metal compact and the like. As the liquid permeates the heated porous medium 36, it is flashed into vapor and as such flows through the channel formed by the inner surface of the boiler shell 25, ridges 38 and helical groove 37, in the direction of opening 35. The tapered form of the porous medium permits the flashed vapor to expand within optimum pressure limitations. The helical configuration of the channel through which the expanding vapor passes serves to insure complete vaporization, thereby eliminating carryover of entrained liquid particles into the prime mover of the system. As the vapor follows the helical path, any liquid particles tend to be thrown to the outside of the channel and in contact with the high temperature surface of the boiler shell 25, where they are vaporized. The expanding vapor flows through opening 35, main vapor line 17 and feeder lines 67 into the respective vapor chests 56. The vapor pressure in vapor chests 56 is equalized by means of the connecting passages 111.

The modified uniflow engine of the power generating system operates on a two stroke cycle. When each piston 54 approaches the top dead center position of the cycle, the top surface of the piston contacts the shock absorber 116 and raises valve 69 from its seat 113 against the pressure of the compression spring 70, thereby admitting the high pressure vapor into cylinder 53. Unnecessary throttling is prevented by means of passages 115, and the annular space between the wall of cylinder 53 and the valve body 114. Piston 54 is forced downward in the cylinder 53 by the vapor pressure, valve 69 being closed by the force of spring 70. The engine may be suitably started by cranking until one piston 54 commences a power stroke. As piston 54 approaches the lower end of its stroke, its top surface uncovers the openings of the passages 119 in the wall of the cylinder 53. High pressure vapor issuing from the nozzle 68 passes through the restricted channel of the steam chest 56 located between —A— and —B— in FIG. 5. This causes a venturi reaction which results in a partial vacuum being created in the lower portion of the vapor chest 56. This partial vacuum serves to sweep from cylinder 53 lower pressure vapor which has expended work on piston 54, recycling such vapor with the high pressure vapor of vapor chest 56 and thereby conserving considerable sensible heat. Any low pressure vapor which is not completely recycled with high pressure vapor flows back through passages 119 when the openings thereof are uncovered by the lower edge of piston 54 on its upstroke. This vapor exhausts directly into the condenser case 14 where it is condensed and collected as liquid on drain pan 62. Cooling of the condenser case 14 is effected by means of any conventional cooling medium, but preferably as shown in FIG. 2 where atmospheric air is drawn through the intake opening 24 and throughout the space formed by the outside of condenser case 14 and cooling jacket 23. Opening 24 is located preferably near the lower surface of the condenser case 14 so as to provide the maximum amount of contact cooling area. The cooling air provides additional cooling as it passes between cooling jacket 23 and exhaust stack 29. This cooling air becomes progressively warmer and finally serves as combustion air for the external heat source 16.

Mechanical power transmission

The force exerted upon piston 54 is transmitted through the connecting rod 55 and cross-head 121 to the crank pin 125. This transmission of force occurs only during that period of time during which the crank pin 125 is in engagement with either end of cranking slot 122. The arcuate surfaces 123 and 124 of cross-head 121 merely serve as limiting guides during periods when the connecting rod 55 is not in motion. By arranging the cylinders 53 radially and in opposed pairs, a smooth power output is transmitted through crankshaft 57 to the drive shaft 12. Flywheel 61 serves to balance the power strokes of the prime mover so as to insure an even power output through shaft 12.

Reserve liquid supply

During periods of peak power generation, a secondary supply means is provided for conducting liquid to the porous medium evaporator 36. This result is achieved by charging liquid directly into the central cavity of the porous medium itself. At high operating pressures the vapor discharge from secondary vapor line 40 creates sufficient vacuum in the upper section 102 of the central cavity so as to draw liquid from the main liquid supply line 18 through the secondary liquid line 41, the discharged liquid falling into the annular grooves 101 and becoming immediately subjected to vapor flashing. Excess liquid accumulates in the well portion 100 and becomes absorbed by the capillary action of the porous medium.

Safety devices

In the preferred embodiment of this invention as illustrated in FIG. 2, the condenser case 14 is constructed as a sealed unit. To prevent the possibility of excess pressure being developed within the condenser case 14, the combination manual and automatic pressure relief valve 73 is located in purge line 71. Furthermore the pressure gage 78 permits visual inspection, and excess pressure within the main vapor line 17 is controlled by the automatic pressure relief valve 74. Upon commencing operation of the system noncondensable gases may be purged through line 72 by means of valve 73 when necessary.

Another embodiment of this invention is illustrated in FIG. 6, certain modifications being shown therein. In this embodiment the condenser case 14 is positioned with its longitudinal axis substantially vertical, the domed end portion 21 being lowermost, thereby creating an effective liquid seal in addition to the vapor seal 19. The liquid body further serves to maintain seal 19 at a lower and more constant temperature. Engine block 52 is arranged in such a manner that it constitutes one end of the condenser case 14, being attached thereto by means of outwardly turned flange 131 and stud bolts 132. An annular sealing gasket 133 is positioned between flange 131 and engine block 52. The vapor generator 15 according to this modification is arranged horizontally and is heated by a conventional gas burner 134, the fuel supply not being shown. The operation of this embodiment is similar to that of the embodiment of FIG. 2, corresponding numerals referring to like parts throughout the drawings. This form of the power generating system functions without reserve liquid supply means and is suitable for installations where unusual power surges are not involved. Obvious economies will inure when this form of construction is permissible.

While certain embodiments of this invention have been described in some detail, it will be obvious to one skilled in the art, that various modifications may be made without departing from its scope. For example, instead of transmitting mechanical power through the wall of condenser case 14, an electric generator may be mounted rigidly within case 14 and driven by shaft 12, producing electricity which may then be conveyed through wiring to its place of use. Likewise, where a sealed operating medium is not required and an unlimited supply of a liquid operating medium is available, condenser case 14 may be exhausted to the atmosphere or eliminated entirely and the liquid inlet side of the vapor generator 15 connected directly to the liquid supply. An example of this type of operation would be the use of such a power generating system as a marine engine on a fresh water lake. Other suitable prime movers such as rotary turbines, may also be used in accordance with the principles of this invention. It will also be apparent that changes may readily be made in the relative shapes of the boiler shell 25 and the porous medium 36. For example, instead of forming a helical channel in the porous medium 36, this channel may be formed in the boiler shell 25 itself. In like manner, any combination of boiler shell and porous medium shapes may be used which produces a space suitable for expansion of the flashed elastic medium, and allows said expanded elastic medium to pass directly through the outlet opening 35. Furthermore, it is not necessary that the elastic medium follow any particular path during the period of its expansion after having been flashed in the vapor generator.

The power generating system of this invention provides a compact, quiet running propulsion unit having greatly simplified control means. Engine speed is controlled directly by the main fuel control valve 27 and it is not necessary to preheat large quantities of liquid. A power plant of this type would be useful for small marine craft and as a secondary power source for large marine vessels. Other uses include adaptations to air and land vehicles and for use as a stationary power plant. Advantages inherent in an apparatus constructed in accordance with this invention are increased fuel economy and portability. Another advantage is the absence of a throttling valve for the elastic fluid medium. In conventional power plants utilizing an elastic fluid medium considerable care must be taken to precondition the liquid feed. This requirement is eliminated by this invention, since the elastic fluid is recycled and need only be purified prior to charging the sealed unit.

Various other embodiments of this invention will be readily apparent to one skilled in the art and I intend that this invention be limited only by the scope of the subjoined claims.

Having thus described this invention, I claim:

1. In a power generating system including in combination a vapor generator, a controlled heat source for said vapor generator, a prime mover utilizing an elastic fluid operating medium and having an inlet opening, exhaust opening and a power output shaft, means for conducting an elastic fluid from said vapor generator into said prime mover, a condenser inclosing said exhaust opening, means for conducting condensed fluid from the condenser directly into said vapor generator, and sealing means for preventing the escape of said elastic fluid from said system and the flow of atmospheric gases into said system, the improvement wherein said vapor generator comprises a boiler having an inlet opening and an outlet opening, a solid porous medium disposed within said boiler so as to cover said inlet opening and arranged to restrict the flow of condensed fluid to a path through said porous medium, said porous medium occupying substantially the entire volume of said boiler in the proximity of said inlet opening and occupying less than the entire volume of said boiler in the proximity of said outlet opening.

2. The apparatus in accordance with claim 1 wherein said porous medium has formed therein a helical passage, said passage terminating in proximity to said outlet opening.

3. The apparatus in accordance with claim 2 wherein said solid porous medium comprises a generally cylindrical core, and said helical passage comprises a helical groove formed on the surface of said core, said groove extending less than the entire length of said core and terminating in the proximity of said outlet opening, the ridges of said groove contacting said boiler throughout the length of said groove, and the depth of said groove increasing in the direction of said outlet opening, said core having a hollow central bore, and means communicating with said bore for conducting condensed fluid from said condenser directly into said bore.

4. The apparatus in accordance with claim 3 wherein said means communicating with the bore of said porous medium for conducting condensed elastic fluid from said condenser into said bore comprises a condensate conduit and a vapor conduit, said vapor conduit being adapted to conduct high pressure vapor and terminating in a restricted portion, said condensate conduit and vapor conduit being arranged so as to form a jet pump, whereby condensed elastic fluid is discharged directly into said bore.

References Cited in the file of this patent

UNITED STATES PATENTS

| 852,033 | Phillippe | Apr. 30, 1907 |
| 947,226 | Dorffel | Jan. 25, 1910 |
| 1,282,136 | Steffenson | Oct. 22, 1918 |
| 1,557,557 | Chaussepied | Oct. 20, 1925 |
| 1,804,694 | Jones | May 12, 1931 |
| 2,075,648 | Huttner | Mar. 30, 1937 |
| 2,079,923 | Pavlecka | May 11, 1937 |
| 2,151,949 | Turner | Mar. 28, 1939 |
| 2,525,804 | Kellogg | Oct. 17, 1950 |
| 2,742,024 | Oberdier | Apr. 17, 1956 |

FOREIGN PATENTS

| 13,486 | Denmark | July 26, 1910 |